United States Patent
Kadle et al.

(10) Patent No.: US 7,640,753 B2
(45) Date of Patent: Jan. 5, 2010

(54) CONTROL METHOD FOR THERMAL REGULATION OF A VEHICLE SEAT

(75) Inventors: Prasad Shripad Kadle, Williamsville, NY (US); Edward Wolfe, IV, Amherst, NY (US); Xiaoxia Mu, East Amherst, NY (US); Lin-Jie Huang, East Amherst, NY (US)

(73) Assignee: Delphi Technologies, Inc., Troy, MI (US)

( * ) Notice: Subject to any disclaimer, the term of this patent is extended or adjusted under 35 U.S.C. 154(b) by 131 days.

(21) Appl. No.: 11/329,711

(22) Filed: Jan. 10, 2006

(65) Prior Publication Data

US 2007/0157630 A1 Jul. 12, 2007

(51) Int. Cl.
*F25B 21/02* (2006.01)
*B60H 1/00* (2006.01)

(52) U.S. Cl. ............................ 62/3.3; 62/3.61; 165/202; 454/120

(58) Field of Classification Search ................. 62/3, 62/3.3, 3.61, 176.6, 3.2; 165/42, 202; 454/120, 454/907
See application file for complete search history.

(56) References Cited

U.S. PATENT DOCUMENTS

| | | | | |
|---|---|---|---|---|
| 2,323,236 A * | 6/1943 | Parks et al. | ............... | 165/213 |
| 5,230,466 A * | 7/1993 | Moriya et al. | ............. | 236/44 A |
| 5,524,439 A * | 6/1996 | Gallup et al. | ................ | 62/3.5 |
| 5,626,021 A * | 5/1997 | Karunasiri et al. | ............ | 62/3.5 |
| 5,918,930 A | 7/1999 | Kawai et al. | | |
| 6,062,641 A * | 5/2000 | Suzuki et al. | ............ | 297/180.1 |
| 6,079,485 A | 6/2000 | Esaki et al. | | |
| 6,105,667 A * | 8/2000 | Yoshinori et al. | .......... | 165/202 |
| 6,474,072 B2 * | 11/2002 | Needham | ...................... | 62/3.2 |
| 6,481,222 B1 * | 11/2002 | Denniston | ..................... | 62/94 |
| 6,535,141 B1 * | 3/2003 | Doherty | .................... | 340/905 |
| RE38,128 E | 6/2003 | Gallup et al. | | |
| 6,793,016 B2 * | 9/2004 | Aoki et al. | ................. | 165/202 |
| 6,871,696 B2 * | 3/2005 | Aoki et al. | .................... | 165/43 |
| 7,201,441 B2 * | 4/2007 | Stoewe et al. | ......... | 297/180.14 |
| 2001/0022222 A1 | 9/2001 | Aoki et al. | | |
| 2004/0089005 A1 * | 5/2004 | Ichishi et al. | ................ | 62/214 |

FOREIGN PATENT DOCUMENTS

| | | |
|---|---|---|
| DE | 10026656 | 5/2000 |
| DE | 100 26 656 | 12/2001 |
| EP | 0970831 | 1/2000 |
| EP | 0 970 831 | 10/2005 |

OTHER PUBLICATIONS

EP Search Report dated Apr. 13, 2007.

* cited by examiner

*Primary Examiner*—Ljiljana (Lil) V Ciric
(74) *Attorney, Agent, or Firm*—Patrick M. Griffin (57) ABSTRACT

Conditioned air discharged from a vehicle heating, ventilation and air conditioning (HVAC) unit is further conditioned by a thermoelectric (TE) air conditioning unit and then directed to air passages in a vehicle seat. Activation of the TE air conditioning unit is based on climate control parameters utilized by the HVAC unit, including a set temperature, radiant heating effects, and cabin air temperature. The climate control parameters are utilized to establish a target seat temperature that optimizes occupant comfort and the transient response of the seat cooling effect.

10 Claims, 6 Drawing Sheets

CONTROL METHOD FOR THERMAL REGULATION OF A VEHICLE SEAT

FIELD OF THE INVENTION

The present invention relates to thermal regulation of a vehicle seat for occupant comfort, and more particularly to a method of controlling seat cooling.

BACKGROUND OF THE INVENTION

Occupant comfort in a motor vehicle can be enhanced by regulating the temperature of the seating surfaces in the passenger compartment. For example, the U.S. Pat. No. 5,918,930 discloses a system in which thermally conditioned air discharged from the vehicle's heating, ventilation and air conditioning (HVAC) system is routed through passages in the vehicle seats. And the U.S. Pat. No. Re. 38,128 discloses a system in which Peltier thermoelectric (TE) devices selectively heat or cool cabin air for delivery to seat passages. Alternately, the TE devices can be configured to receive air discharged from the HVAC system for improved transient control of seat temperature.

Ideally, seat temperature regulation in a vehicle should be performed automatically (that is, in a way that does not require the occupant to select a temperature control setting for the seat) and consistent with occupant comfort considerations. The present invention is directed to such a control methodology.

SUMMARY OF THE INVENTION

The present invention provides an improved control methodology for a thermally conditioned vehicle seat in which a TE unit supplies conditioned air to the seat. Preferably, air discharged from the vehicle HVAC unit is further conditioned by the TE unit and then directed to the seat. Activation of the TE unit is automatically controlled based on climate control parameters utilized by the HVAC unit, including a set temperature, radiant heating effects, and cabin air temperature. The climate control parameters are utilized to establish a target seat temperature that optimizes occupant comfort and the transient response of the seat cooling effect.

DESCRIPTION OF THE PREFERRED EMBODIMENT

Figure 1:
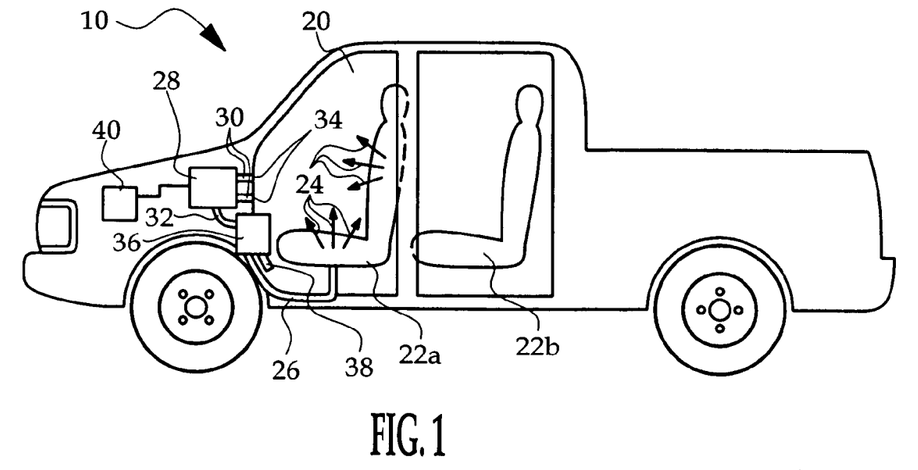
FIG. 1 is a diagram of a vehicle including an HVAC system, a TE air conditioning unit and a vehicle seat.

Referring to FIG. 1, the reference numeral 10 generally designates a motor vehicle including a cabin 20 and occupant seats 22a and 22b. At least one of the seats 22a is provided with internal air passages 24, including perforated seat and back cushions. Air supplied to the seat 22a via the air duct 26 flows through the air passages 24 to cool or heat the seating surfaces for enhanced occupant comfort. A heating, ventilation and air conditioning (HVAC) unit 28 develops conditioned air based on an operator temperature control setting, and supplies the conditioned air to cabin ducts 30 and one or more seat ducts 32. The cabin ducts 30 convey the conditioned air to cabin vents 34 and the seat duct 32 conveys the conditioned air to a thermoelectric (TE) air conditioning unit 36. The TE air conditioning unit 36 further conditions a portion of the air supplied to it via seat duct 32; the further conditioned air is supplied to the air passages 24 of seat 22a by the air duct 26, and the remaining air is exhausted into the cabin 20 through the exhaust duct 38. A vehicle electrical system including a storage battery 40 supplies electrical power to the HVAC unit 28, which in turn, supplies electrical power to the TE air-conditioning unit 36.

Figure 2:
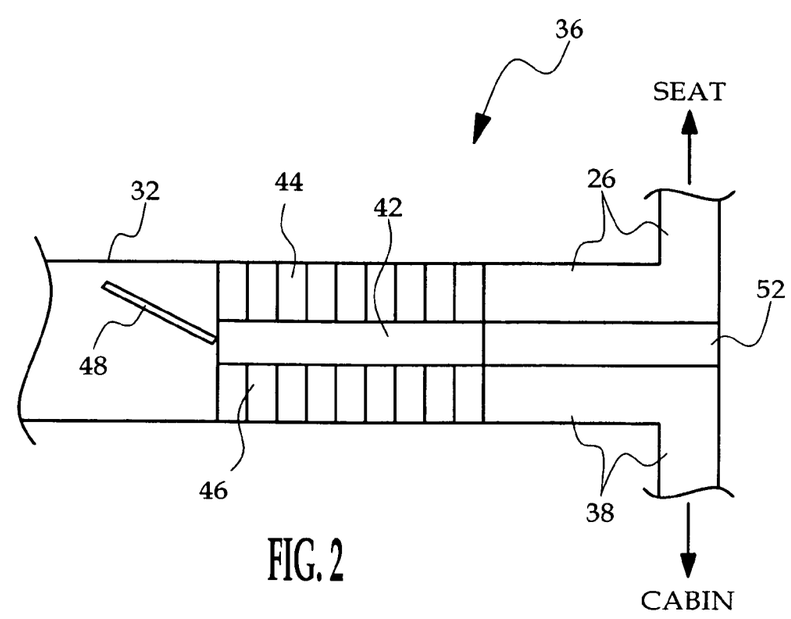
FIG. 2 is a diagram of the TE air conditioning unit of FIG. 1.

Referring to FIG. 2, the TE air-conditioning unit 36 includes a Peltier TE device 42 and a pair of heat exchangers 44, 46. A flow divider 48 positioned in the seat duct 32 apportions the inlet air from HVAC unit 28 between the heat exchangers 44 and 46. Inlet air directed through heat exchanger 44 is supplied to the seat passages 24 via air duct 26, while air directed through heat exchanger 46 is exhausted into the cabin 20 via exhaust duct 38. A thermal insulator 52 disposed between the ducts 26 and 38 downstream of the TE device 42 inhibits the transfer of thermal energy between the ducts 26 and 38.

Figure 3:
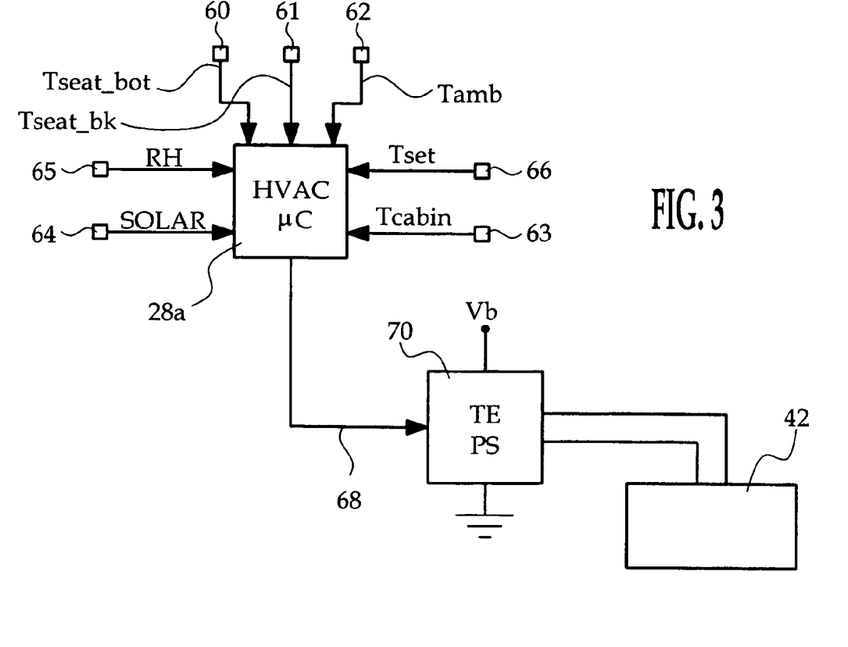
FIG. 3 is a diagram of a microprocessor-based HVAC controller for carrying out the control method of the present invention.

In operation, the HVAC unit 28 selectively activates the TE device 42 to further heat or chill the air flowing through heat exchanger 44 to provide optimal occupant comfort. In the illustrated embodiment, the control of TE device 42 is implemented by a microcontroller (uC) 28a resident within a control head of HVAC unit 28. Referring to FIG. 3, microcontroller 28a is responsive to a number of inputs provided by the temperature sensors 60-63, the solar sensor 64, and optionally by the relative humidity sensor 65. The temperature sensors 60 and 61 are located in the bottom and back cushions of seat 22a, respectively, and produce the seat temperature signals designated as Tseat_bot and Tseat_bk. The temperature sensors 62 and 63 are responsive to the temperatures of ambient air and cabin air, respectively, and produce the temperature signals designated as Tamb and Tcabin. The solar sensor 64 may be a conventional automotive solar radiation sensor, or a mean radiant temperature sensor, and produces a signal designated as SOLAR. The relative humidity sensor 65 is responsive to the humidity in ambient air, and produces a signal designated as RH. An additional input designated as Tset is supplied by a vehicle occupant through a user interface device 66, and represents a desired cabin air temperature. The microcontroller (uC) 28a executes a number of resident software routines for developing various HVAC-related outputs, including a duty-cycle output DC on line 68 representing the desired mode (heating or cooling) and activation level of TE air-conditioning unit 36. The duty-cycle output is supplied to a thermoelectric power supply (TE PS) 70 which correspondingly activates the TE device 42 of TE air-conditioning unit 36 using battery voltage Vb.

In general, the present invention is directed to a control method carried out by the microcontroller 28a during the air conditioning mode where HVAC unit 28 supplies chilled air to the cabin and seat ducts 30, 32 in order to satisfy the occupant set temperature Tset. The microcontroller 28a develops a target seat temperature Tseat_tar, and activates TE device 42 to bring the measured seat temperatures Tseat_bk and Tseat_bot into conformance with Tseat_tar.

To make sure the control is consistent with occupant comfort considerations, the control is based in part on the mean radiant temperature Tmr in cabin 20. Technically, Tmr may be defined as the uniform surface temperature of an imaginary enclosure in which an occupant would exchange the same amount of radiant heat as in the actual non-uniform space. The temperature Tmr in ° K can be calculated using the equation:

$$\bar{T}_{mr} = \sqrt[4]{\sum_n F_{p-i}(T_i + 273)^4} - 273 \tag{1}$$

where $T_i$ is the surface temperature of a surface i, and $F_{p-i}$ is the view factor between the person and surface, i. In the illustrated embodiment, however, the value of Tmr is determined based on the inputs discussed above in reference to FIG. 3. In cases where the sensor 64 is a conventional automotive solar sensor, Tmr is calculated as a combined function of SOLAR and Tamb; in cases where the sensor 64 is responsive to mean radiant temperature, Tmr is obtained directly from SOLAR.

The control is implemented by establishing a reference or threshold cabin temperature Tthr_cabin for comparison with the measured cabin temperature Tcabin. When Tcabin is above Tthr_cabin, the target seat temperature Tseat_tar is determined based on Tset and the mean radiant temperature Tmr of the cabin 20 to quickly cool the seats as the cabin air is also being cooled by HVAC unit 28. When the HVAC unit 28 has reduced Tcabin to Tthr_cabin, the target seat temperature Tseat_tar is increased based on Tmr and the amount by which Tcabin falls below Tthr_cabin. Additionally, the set temperature Tset may be adjusted based on the measured relative humidity RH since occupant comfort is related to humidity as well as temperature. For example, a humidity-compensated set temperature Tset' may be calculated based on Tset and RH according to:

$$Tset'=Tset+[K1*(CAL\_RH-RH)] \tag{2}$$

where K1 is a calibrated gain constant and CAL_RH is a calibrated relative humidity such as 45%.

The threshold cabin temperature Tthr_cabin represents a cabin temperature for optimal occupant comfort, and is computed according to:

$$Tthr\_cabin=(K2*Tset)-(K3*Tmr) \tag{3}$$

where the coefficients K2 and K3 are calibrated constants. In a mechanization of the present invention, K2 and K3 were assigned values of 1.25 and 0.1825, respectively.

When Tcabin is greater than or equal to Tthr_cabin, the control is in a transient cool-down mode, and the target seat temperature Tseat_tar is computed according to:

$$Tseat\_tar=(K4*Tset)-(K5*Tmr) \tag{4}$$

where K4 and K5 are calibrated constants. For example, K4 and K5 may be assigned values of 1.0 and 0.1, respectively. The first temperature component (K4*Tset) directly influences Tseat_tar as a function of the occupant-selected set temperature Tset. Using equation (2), the occupant-selected value of Tset can be adjusted downward to compensate for relative humidity readings above CAL_RH % and upward to compensate for relative humidity readings below CAL_RH %. The second temperature component (K5*Tmr) inversely influences Tseat_tar as a function of the mean radiant temperature Tmr which represents the heating effects of solar radiation in cabin 20. That is, the target seat temperature is lowered to offset increased solar radiation in cabin 20, and vice-versa.

When Tcabin falls below Tthr_cabin, the control transitions from the transient cool-down mode to a steady-state mode in which the target seat temperature Tseat_tar is gradually increased for sustained occupant comfort. This is achieved by defining a steady state modifier SS_MOD and computing Tseat_tar according to:

$$Tseat\_tar=(K4*Tset)-(K5*Tmr)+SS\_MOD \tag{5}$$

The steady state modifier SS_MOD sustains occupant comfort by bringing the steady-state seat temperature closer to the occupant's body temperature, and its value is scheduled as a function of the mean radiant temperature Tmr to compensate for changes in thermal coupling between the occupant and the seat. A relatively low value of Tmr (18° C., for example) implies the occupant is wearing relatively heavy clothing, resulting in relatively low thermal coupling; in this case the steady state modifier SS_MOD has a relatively low value, say 5-7° C. Conversely, a relatively high value of Tmr (27° C., for example) implies the occupant is wearing relatively light clothing, resulting in relatively high thermal coupling; in this case the steady state modifier SS_MOD has a higher value, say 9-11° C. Intermediate values of SS_MOD can be utilized for intermediate values of Tmr. Of course, the specific ranges of Tmr and SS_MOD can be calibrated to suit a particular application.

Figure 4:
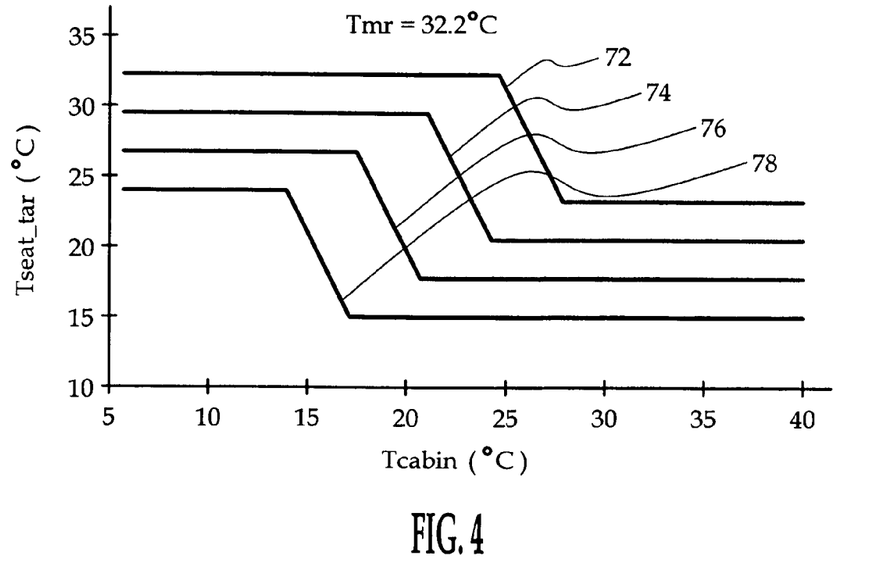
FIG. 4 is a graph illustrating representative target seat temperature schedules according to this invention.

As Tcabin falls below the threshold Tthr_cabin, the steady-state modifier SS_MOD is progressively applied to avoid step changes in seat temperature. In the illustrated embodiment, this is achieved by applying the multiplier:

$$(Tthr\_cabin-Tcabin)/3 \tag{6}$$

to SS_MOD when Tcabin is between Tthr_cabin and (Tthr_cabin-3° C.). As Tcabin falls below Ttrh_cabin, the temperature modification SS_MOD is progressively applied; and is fully applied when Tcabin is three or more degrees below Tthr_cabin. This is graphically illustrated FIG. 4, where the traces 72, 74, 76 and 78 depict Tseat_tar as a function of Tcabin for Tset values of 26.7° C., 23.9° C., 21° C. and 18° C. For the illustration, Tmr is assumed to have a value of 32.2° C. Referring to trace 72, for example, Tthr_cabin has a value of 27.5° C. when Tset is 26.7° C. and Tmr is 32.2° C. When Tcabin is higher than Tthr_cabin, Tseat_tar has a value of 23.5° C. When Tcabin falls below Tthr_cabin, Tseat_tar increases due to the operation of the steady-state modifier SS_MOD. And when Tcabin is three or more degrees below Tthr_cabin (i.e., 24.5° C. or lower), the steady-state modifier SS_MOD is fully applied, giving Tseat_tar a value of 32.5° C. If an occupant decreases Tset to lower the cabin temperature, equation (3) proportionately reduces Tthr_cabin, and equations (4)-(6) correspondingly reduce Tseat_tar, and vice-versa. If Tmr increases due to increased solar loading, equation (3) proportionately reduces Tthr_cabin, and equations (4)-(6) correspondingly reduce Tseat_tar, and vice-versa.

The flow diagrams of FIGS. 5A-5C and 6 represent a software routine executed by microcontroller 28a during the cooling mode of HVAC unit 28 for carrying out the method of the present invention. When seat temperature control is first enabled in a given period of vehicle operation, the blocks 90-92 configure TE air conditioning unit 36 for cooling, and activate the TE device 42 for maximum cooling. The various inputs described above in reference to FIG. 3 are sampled at block 94, and the blocks 96-98 are then executed to calculate or otherwise determine the mean radiant temperature Tmr, the humidity-compensated set temperature Tset', and the actual seat temperature Tseat. As indicated at block 98, the actual seat temperature Tseat is calculated as the average of the seat temperature inputs Tseat_bot and Tseat_bk. The block 100 is then executed to calculate the target seat temperature Tseat_tar.

The block 102 determines the current mode (heating or cooling) of the TE device 42. Initially, the TE device will be configured for cooling due to the operation of block 92; in this case, block 102 is answered in the affirmative, and the blocks 104-116 of FIG. 5B are executed as indicated by the flow connector blocks B. Referring to FIG. 5B, the block 104 determines if Tseat is within 2° C. of Tseat_tar. If so, the current activation level of TE device 42 is maintained. If Tseat is not within 2° C. of Tseat_tar, the block 106 determines if Tseat is greater than Tseat_tar. Thus, block 106 will be answered in the affirmative if Tseat is above Tseat_tar by at least 2° C., and in the negative if Tseat is below Tseat_tar by at least 2° C. When block 106 is answered in the affirmative (Tseat too warm), the block 108 is executed to incrementally increase the activation level of TE device 42, if it is not already at the maximum level. When 106 is answered in the negative (Tseat too cool), the blocks 110 and 112 incrementally decrease the activation level of TE device 42 if activated. If TE device 42 is not activated, the block 114 changes the mode of TE device 42 to heating. So long as seat temperature control continues to be enabled, microcontroller 28a is returned to block 94 of FIG. 5A as indicted by the flow connector blocks A; otherwise, the routine is exited.

Figure 5A:
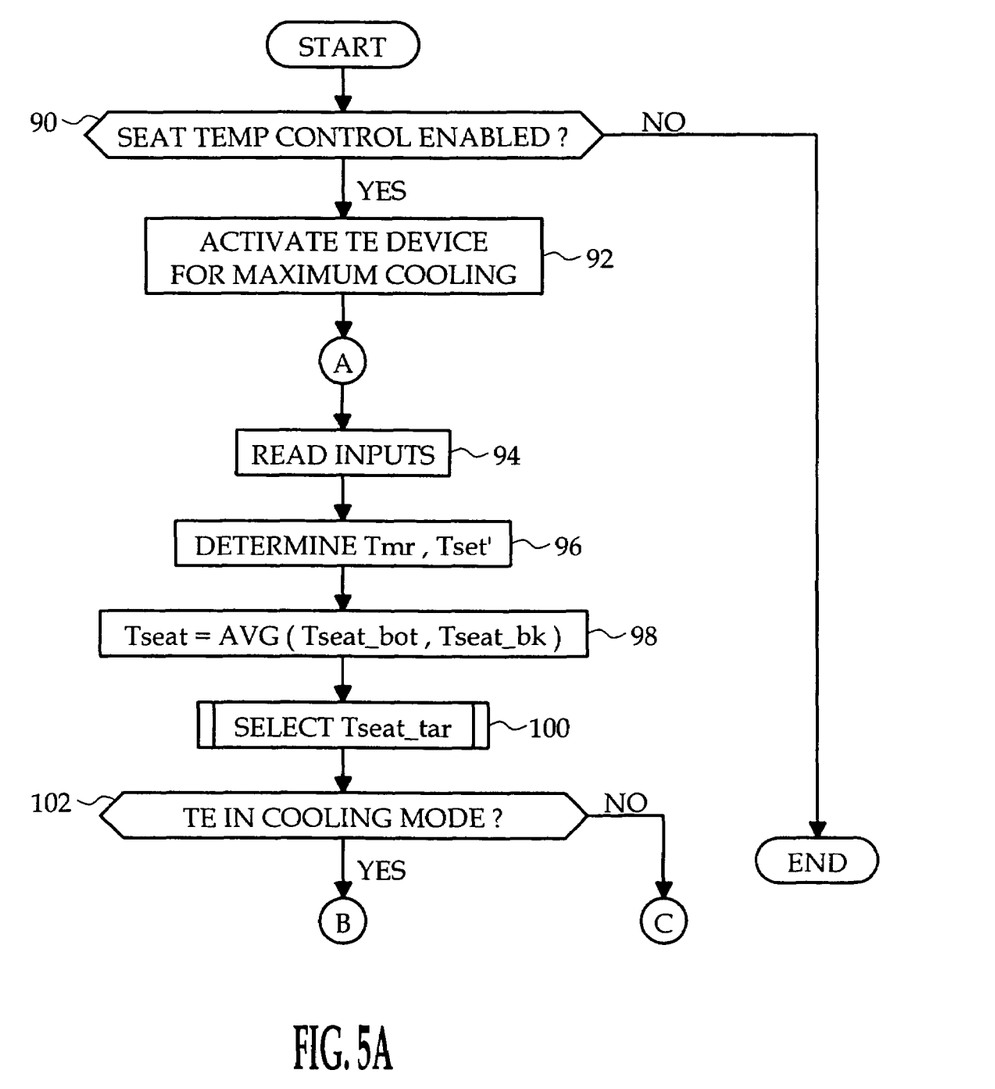
FIGS. 5A, 5B and 5C together form a flow diagram representing a software routine executed by the HVAC controller of FIG. 3 for carrying out the control method of the present invention.
Figure 5B:
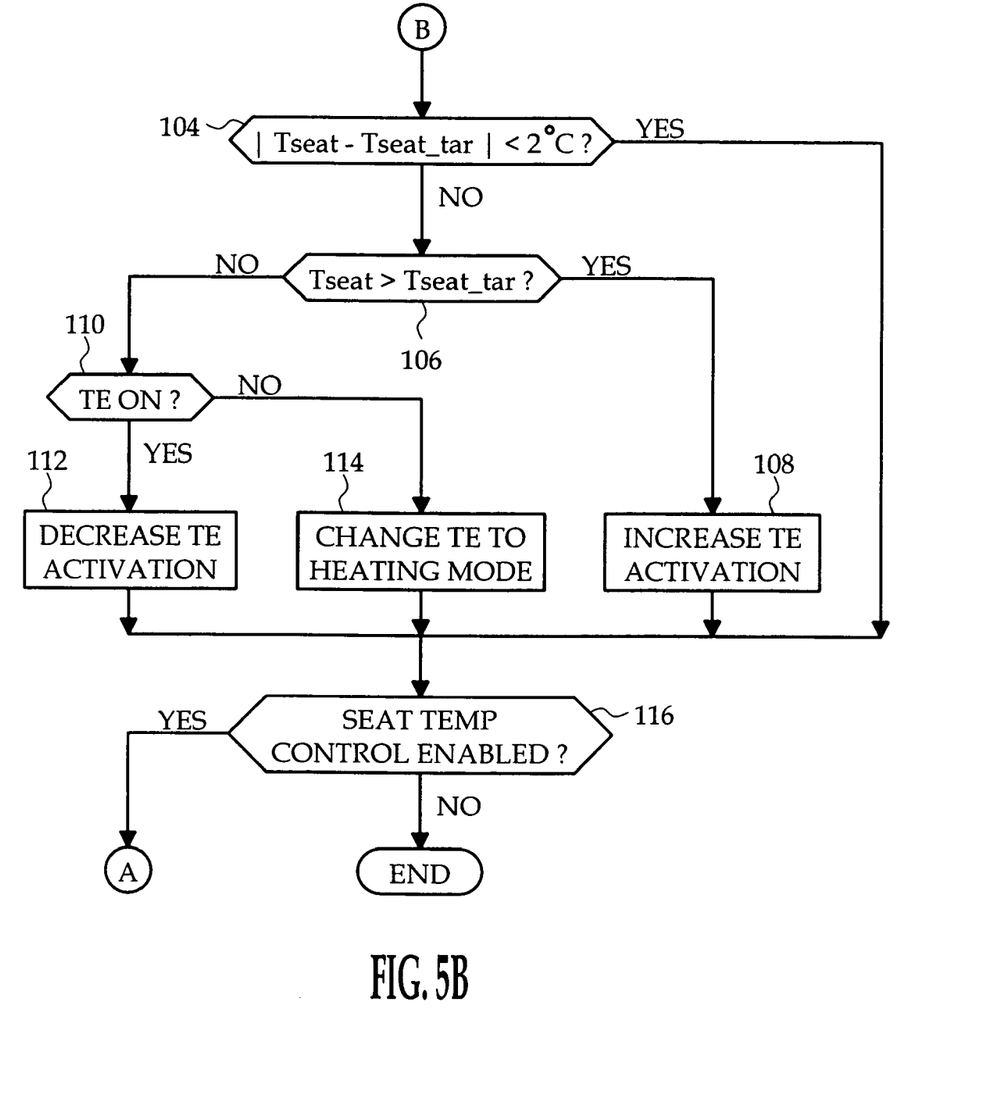
Figure 5C:
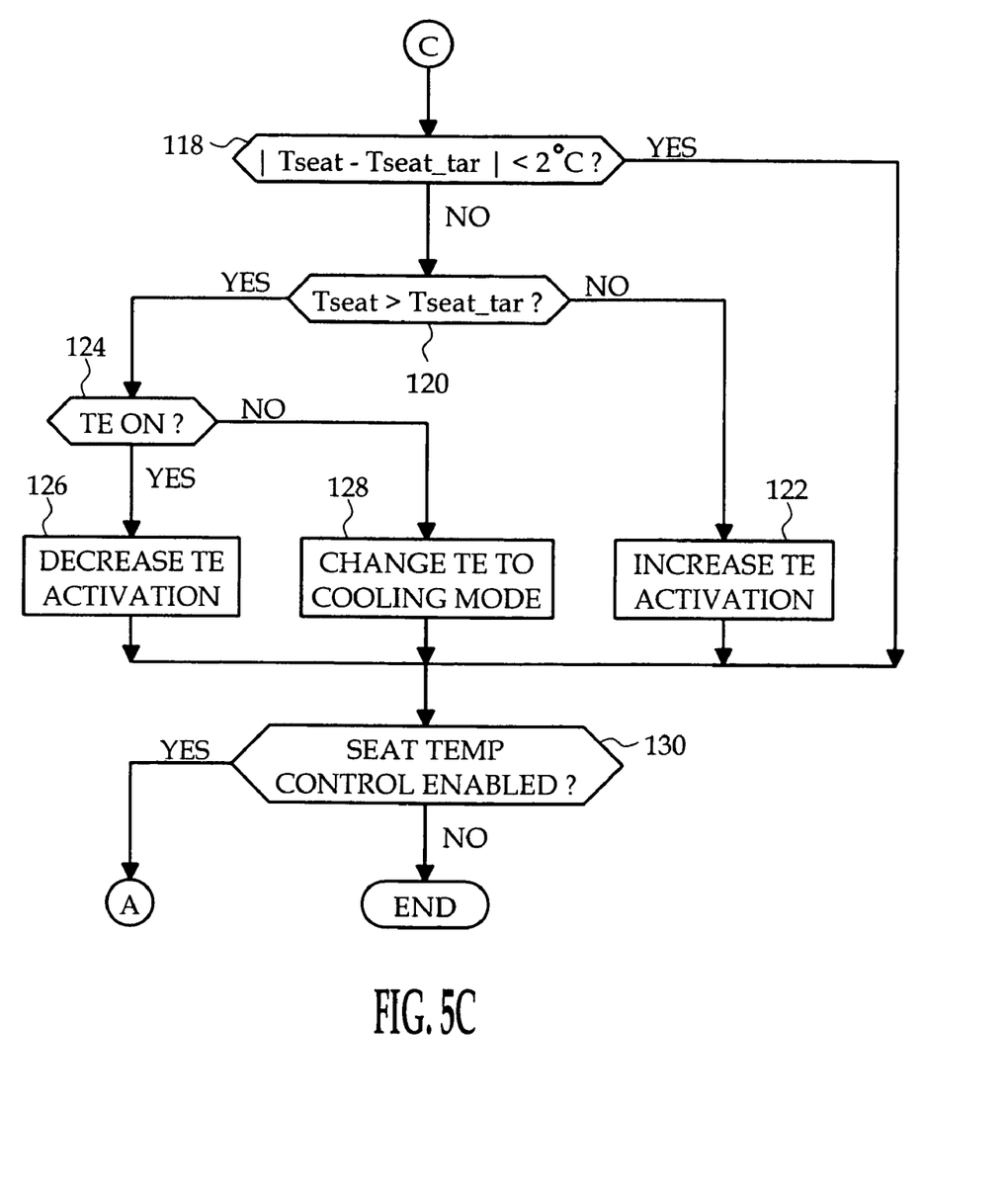

If the mode of TE device 42 is changed to heating as described above, the block 102 of FIG. 5A will direct microcontroller 28a to execute the blocks 118-130 of FIG. 5C as indicated by the flow connector blocks C. Referring to FIG. 5C, the block 118 determines if Tseat is within 2° C. of Tseat_tar. If so, the current activation level of TE device 42 is maintained. If Tseat is not within 2° C. of Tseat_tar, the block 120 determines if Tseat is greater than Tseat_tar. Thus, block 106 will be answered in the affirmative if Tseat is above Tseat_tar by at least 2° C., and in the negative if Tseat is below Tseat_tar by at least 2° C. When block 106 is answered in the negative (Tseat too cool), the block 122 is executed to incrementally increase the activation level of TE device 42, if it is not already at the maximum level. When 120 is answered in the affirmative (Tseat too warm), the blocks 124 and 126 incrementally decrease the activation level of TE device 42 if activated. If TE device 42 is not activated, the block 128 changes the mode of TE device 42 to cooling. So long as seat temperature control continues to be enabled, microcontroller 28a is returned to block 94 of FIG. 5A as indicted by the flow connector blocks A; otherwise, the routine is exited.

Figure 6:
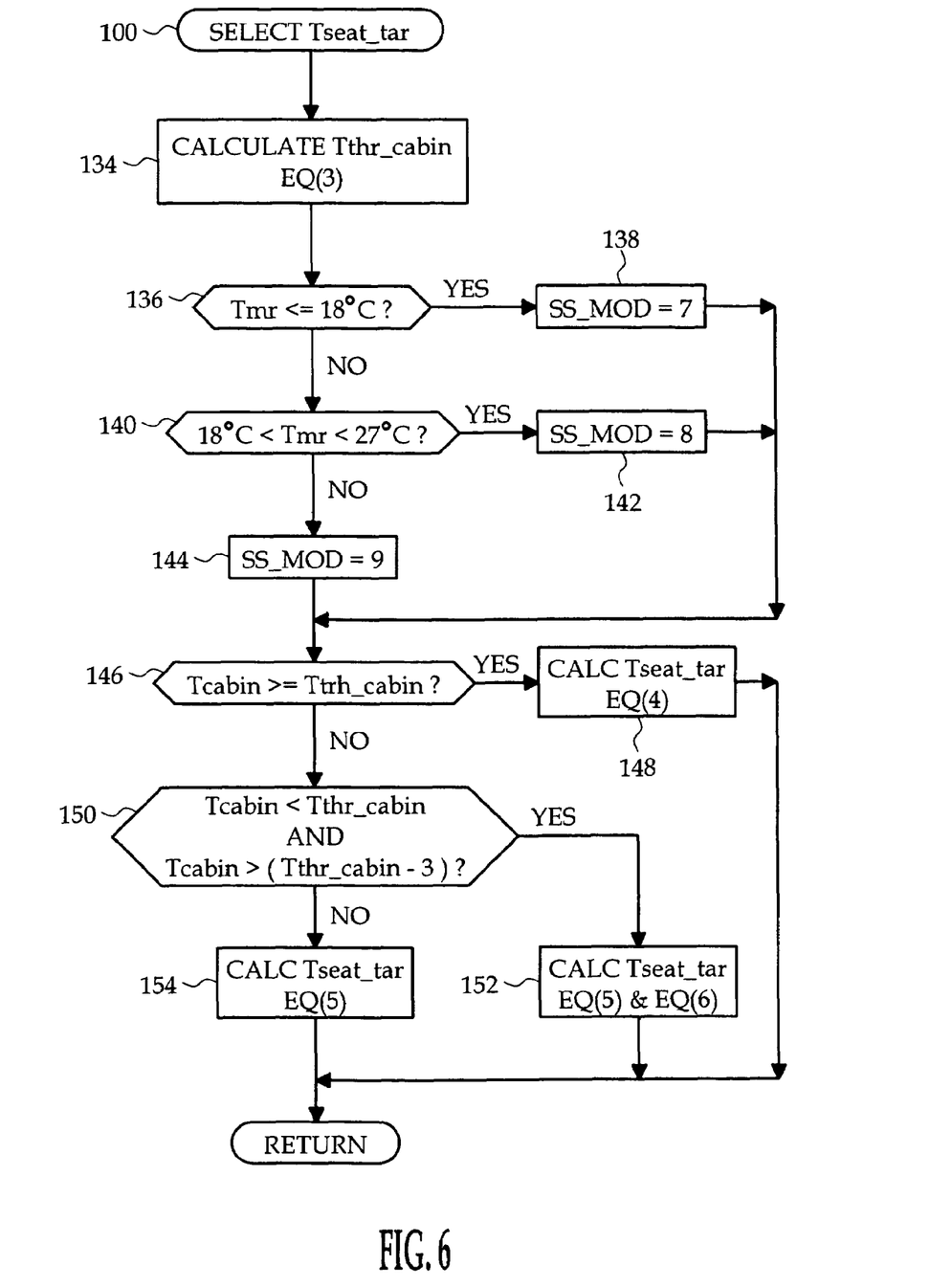
FIG. 6 is a flow diagram detailing a portion of the flow diagram of FIG. 5 pertaining to target seat temperature selection.

The flow diagram of FIG. 6 depicts a routine corresponding to block 100 of FIG. 5A: selecting the target seat temperature Tseat_tar. Referring to FIG. 6, the block 134 calculates the cabin temperature threshold Tthr_cabin based on Tset and Tmr using equation (3). The blocks 136, 138, 140, 142 and 144 then schedule the steady-state modifier SS_MOD based on Tmr. Block 146 determines if Tcabin is greater than or equal to the threshold Tthr_cabin; if so, block 148 calculates Tseat_tar based on Tset and Tmr using equation (4). Block 150 determines if Tcabin is between Tthr_cabin and (Tthr_cabin−3); if so, block 152 calculates Tseat_tar based on Tset, Tmr and SS_MOD using equations (5) and (6). If blocks 146 and 150 are both answered in the negative, Tcabin is more than three degrees below Tthr_cabin, and block 154 calculates Tseat_tar based on Tset, Tmr and SS_MOD using equation (5), completing the routine.

In summary, the present invention provides an easily implemented automatic control method for thermoelectric cooling of a vehicle seat. The control method accounts for ambient and radiant effects, and achieves a desired occupant comfort level without requiring extensive calibration effort. While the present invention has been described with respect to the illustrated embodiment, it is recognized that numerous modifications and variations in addition to those mentioned herein will occur to those skilled in the art. For example, the disclosed control method could be used in a system where the HVAC discharge air or even cabin air is drawn through the TE air conditioning unit 36 by an auxiliary fan, the steady-state modifier SS_MOD could be phased in based on elapsed time, and so on. Accordingly, it is intended that the invention not be limited to the disclosed embodiment, but that it have the full scope permitted by the language of the following claims.

The invention claimed is:

1. A method of operation for a thermoelectric air conditioning unit that delivers conditioned air to a passenger seat of a vehicle, where the vehicle additionally includes a heating, ventilation and air conditioning (HVAC) unit for thermally conditioning air in a cabin of said vehicle, the method comprising the steps of:
   determining a mean radiant temperature in said cabin;
   computing a target seat temperature during a cooling mode of said HVAC unit based on the determined mean radiant temperature and a set temperature of said HVAC unit;
   determining an average temperature of said seat; and
   controlling an operating mode and activation level of said thermoelectric air conditioning unit based on a comparison of the determined average temperature of said seat and the computed target seat temperature to bring the determined average seat temperature into conformance with said target seat temperature.

2. The method of claim 1, including the steps of:
   determining a relative humidity of ambient air; and
   adjusting said set temperature based on the determined relative humidity so that the computed target seat temperature varies in inverse relation to the relative humidity.

3. The method of claim 1, including the steps of:
   calculating an optimal cabin air temperature based on said set temperature and said mean radiant temperature;
   measuring a temperature of air in said cabin; and
   raising the computed target seat temperature when the measured cabin air temperature falls below the calculated optimal cabin air temperature.

4. The method of claim 3, where:
   the computed target seat temperature is raised by an amount based on the mean radiant temperature in said cabin when the measured cabin air temperature falls below the calculated optimal cabin air temperature.

5. The method of claim 3, including the steps of:
   determining a temperature modifier for the computed target seat temperature; and
   progressively applying said temperature modifier to said computed target seat temperature.

6. The method of claim 5, including the steps of:
   progressively applying said temperature modifier to said computed target seat temperature based on an amount by which the measured cabin air temperature falls below the calculated optimal cabin air temperature.

7. The method of claim 1, including the steps of:
   increasing the activation level of said thermoelectric air conditioning unit to provide more seat cooling when said thermoelectric air conditioning unit is in a cooling mode and the determined average seat temperature is above the target seat temperature by at least a calibrated value;

decreasing the activation level of said thermoelectric air conditioning unit when said thermoelectric air conditioning unit is in said cooling mode to provide less seat cooling when the determined average seat temperature is below the target seat temperature by at least said calibrated value; and changing said thermoelectric air conditioning unit from said cooling mode to a heating mode when the determined average seat temperature is below the target seat temperature by at least said calibrated value and the activation level of said thermoelectric air conditioning unit has been decreased to a minimum level.

8. The method of claim 1, including the steps of:

increasing the activation level of said thermoelectric air conditioning unit to provide more seat heating when said thermoelectric air conditioning unit is in a heating mode and the determined average seat temperature is below the target seat temperature by at least a calibrated value;

decreasing the activation level of said thermoelectric air conditioning unit when said thermoelectric air conditioning unit is in said heating mode to provide less seat heating when the determined average seat temperature is above the target seat temperature by at least said calibrated value; and changing said thermoelectric air conditioning unit from said heating mode to a cooling mode when the determined average seat temperature is above the target seat temperature by at least said calibrated value and the activation level of said thermoelectric air conditioning unit has been decreased to a minimum level.

9. The method of claim 1, including the step of:

controlling said thermoelectric air conditioning unit to provide maximum cooling of the air delivered to said passenger seat upon initial activation of said HVAC unit in said cooling mode.

10. The method of claim 1, including the steps of:

measuring a first temperature in a bottom of said seat and a second temperature in a back of said seat; and determining said average seat temperature according to an average of said first and second temperatures.

* * * * *